(12) United States Patent
Omae

(10) Patent No.: US 10,913,405 B2
(45) Date of Patent: Feb. 9, 2021

(54) WIRE HARNESS

(71) Applicant: SUMITOMO WIRING SYSTEMS, LTD., Yokkaichi (JP)

(72) Inventor: Hikaru Omae, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/616,578

(22) PCT Filed: Jun. 27, 2018

(86) PCT No.: PCT/JP2018/024314
§ 371 (c)(1),
(2) Date: Nov. 25, 2019

(87) PCT Pub. No.: WO2019/004265
PCT Pub. Date: Jan. 3, 2019

(65) Prior Publication Data
US 2020/0079302 A1 Mar. 12, 2020

(30) Foreign Application Priority Data

Jun. 29, 2017 (JP) .................................. 2017-127646

(51) Int. Cl.
*B60R 16/02* (2006.01)
*H02G 15/013* (2006.01)
*H02G 3/04* (2006.01)

(52) U.S. Cl.
CPC ....... *B60R 16/0215* (2013.01); *H02G 3/0418* (2013.01); *H02G 15/013* (2013.01)

(58) Field of Classification Search
CPC . B60R 16/0215; B60R 16/02; B60R 16/0222; B60L 50/16; B60L 50/66;
(Continued)

(56) References Cited

U.S. PATENT DOCUMENTS 3,363,049 A * 1/1968 Gosling ................... H01R 4/64
174/85
3,939,298 A * 2/1976 Gosling ................. H02G 15/24
174/21 R
(Continued)

FOREIGN PATENT DOCUMENTS

JP S62-043854 U 3/1987
JP H10-85536 A 4/1998
(Continued)

OTHER PUBLICATIONS

Black Box-Solid vs. Stranded Cable_p. 1_Nov. 2016.*
Sep. 4, 2018 International Search Report issued in International Patent Application No. PCT/JP2018/024314.

*Primary Examiner* — Timothy J Thompson
*Assistant Examiner* — Guillermo J Egoavil
(74) *Attorney, Agent, or Firm* — Oliff PLC

(57) ABSTRACT

A wire harness that includes a wire having a first wire, a second wire that is more bendable than the first wire, and a connection for electrically connecting the first wire and the second wire to each other; a tube for accommodating at least one of the first wire and the second wire; and a covering ventilation that is tubular, has a covering for surrounding the connection and a surrounding region of the connection of the wire, and is connected to the tube.

10 Claims, 3 Drawing Sheets

(58) Field of Classification Search
CPC ... B60L 2240/36; H01B 7/04; H01B 13/0036; H01B 7/00; H01B 7/42; H01B 7/0009; H01R 4/70; H01R 4/726; H01R 2201/26; H02G 1/14; H02G 15/013; H02G 15/113; H02G 3/04; H02G 3/0418; Y02T 10/70; Y02T 10/7072
USPC ...................................... 174/72 A, 115, 72 R
See application file for complete search history.

(56) References Cited

U.S. PATENT DOCUMENTS

| | | | |
|---|---|---|---|
| 5,914,415 A | 6/1999 | Tago | |
| 7,211,732 B2* | 5/2007 | Yagi | H01R 13/5205 174/74 R |
| 2002/0166859 A1* | 11/2002 | McGrew, Jr. | B65D 51/1622 220/366.1 |
| 2005/0108981 A1* | 5/2005 | Kadotani | E04C 5/10 52/741.1 |
| 2009/0218135 A1* | 9/2009 | Vallauri | H02G 15/103 174/880 |
| 2013/0298539 A1* | 11/2013 | Jang | E02F 9/0866 60/320 |
| 2014/0041520 A1* | 2/2014 | Daimon | B01D 69/10 96/4 |
| 2015/0010782 A1* | 1/2015 | Tanigaki | B60L 58/26 429/7 |
| 2015/0101842 A1* | 4/2015 | Han | B60R 16/0215 174/50.57 |
| 2016/0071630 A1 | 3/2016 | Sugino | |
| 2016/0148720 A1* | 5/2016 | Kanagawa | H01B 7/0009 174/115 |
| 2019/0135204 A1* | 5/2019 | Oohira | H02G 3/06 |
| 2019/0329725 A1* | 10/2019 | Omae | B60R 16/0215 |

FOREIGN PATENT DOCUMENTS

| | | | | |
|---|---|---|---|---|
| JP | 2013-067254 A | | 4/2013 | |
| JP | 2013067254 A | * | 4/2013 | ............ B60R 16/02 |
| JP | 2013-241143 A | | 12/2013 | |
| JP | 2016-058137 A | | 4/2016 | |

\* cited by examiner

WIRE HARNESS

BACKGROUND

The present disclosure relates to a wire harness.

Wires are covered by a protective tube to protect the wires from the intrusion of water, and dust, or the like. Since wires are laid out in various modes, the protective tube is configured as a connected body formed by connecting a plurality of types of tubes with different structures to each other. For example, the protective tube includes a pipe for protecting intermediate portions of wires, and a rubber water-proofing cover for protecting portions of the wires between the pipe and connectors. The protective tube seals a portion of each wire between a connector at one end and a connector at the other end. For this reason, the internal pressure in the protective tube may increase due to, for example, a change in air pressure caused by a change in the temperature in the protective tube. The water-proofing cover is provided with an air-permeable film in order to suppress such an increase in the internal pressure. Air can flow between the inside and outside of the protective tube through the air-permeable film (e.g. see JP 2013-241143A).

SUMMARY

In recent years, the magnitude of a current that flows through the wires inserted into the protective tube has been on the rise, and the amount of heat generated by the wires has also increased. For this reason, improvement in heat dissipation of a wire harness that includes a protective tube and wires has been desired.

An exemplary aspect of the disclosure provides a wire harness that improves heat dissipation.

A wire harness a wire having a first wire, a second wire that is more bendable than the first wire, and a connection for electrically connecting the first wire and the second wire to each other; a tube for accommodating at least one of the first wire and the second wire; and a covering ventilation that is tubular, has a covering for surrounding the connection and a surrounding region of the connection of the wire, and is connected to the tube, wherein: wherein the covering is provided with a ventilation having a property of allowing a passage of gas and restricting a passage of liquid, and the connection has a larger area of a cross-section than that of a core wire of the first wire and that of a core wire of the second wire, the cross-section being perpendicular to a direction in which the wire extends.

According to this configuration, the connection for electrically connecting the first wire and the second wire to each other has a larger area of a cross-section perpendicular to the direction in which the wires extends, than that of the core wire of the first wire and that of the core wire of the second wire. Accordingly, the connection has less heat generated per unit cross-sectional area when a current flows therethrough, than that of the core wire of the first wire and that of the core wire of the second wire. Accordingly, heat is readily transmitted from the wire in a surrounding region of the connection to the connection. Furthermore, the ventilation that allows the passage of gas is provided near the connection, which serves as a destination to which heat generated in other sections is transmitted. For this reason, air that has been warmed near the connection by heat generated at the connection itself, heat transmitted from the wire in a section other than the connection, or the like, can be released to the outside of the covering ventilation through the ventilation. With this configuration, heat is unlikely to accumulate in a surrounding region of the connection and heat dissipation at the connection can thus be improved, and, as a result, heat dissipation of the wire harness can be improved.

According to the wire harness of the present disclosure, heat dissipation can be improved.

DETAILED DESCRIPTION OF EMBODIMENTS

Figure 1:
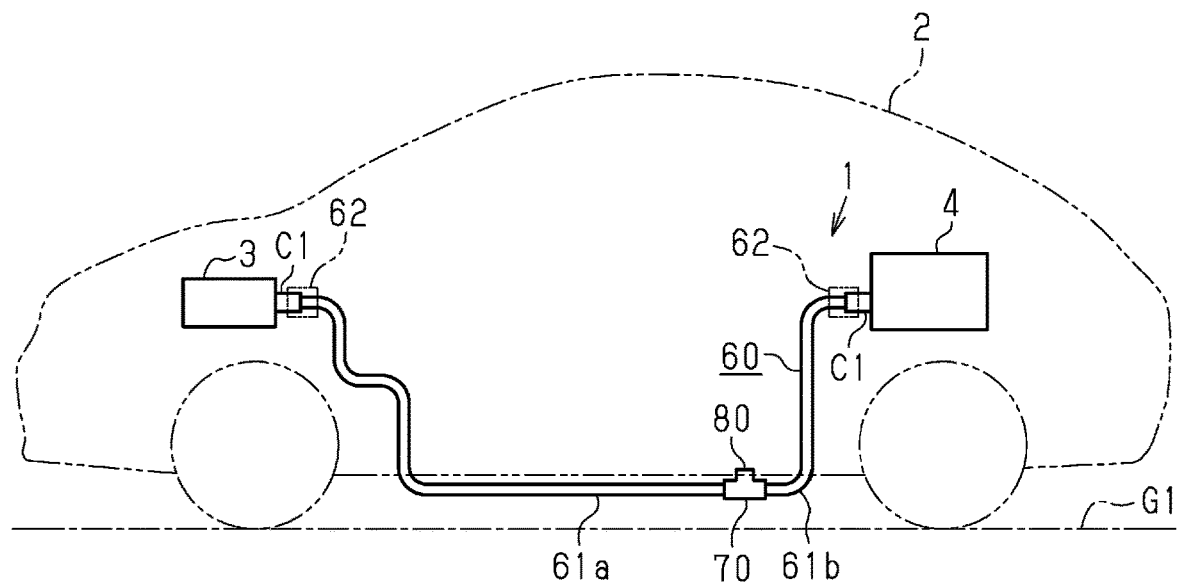
FIG. 1 is a schematic configuration diagram of a vehicle according to an embodiment.

Hereinafter, an embodiment of the present disclosure will be described with reference to FIGS. 1 to 4. There may be cases where, in the drawings, some portions of the configuration is exaggerated or simplified for convenience of description. The size ratio between portions may also differ from the actual size ratio.

A wire harness 1 shown in FIG. 1 electrically connects two, three, or more electrical devices to each other. The wire harness 1 according to this embodiment electrically connects an inverter 3, which is installed in a front part of a vehicle 2, such as a hybrid vehicle or an electric vehicle, and a high-voltage battery 4, which is installed rearward of the inverter 3 in the vehicle 2. The wire harness 1 is laid out so as to pass under the floor of the vehicle 2, for example. The inverter 3 is connected to a motor (not shown) for driving wheels, the motor serving as a motive power source for causing the vehicle to travel. The inverter 3 generates AC power using DC power of the high-voltage battery 4, and supplies the AC power to the motor. The high-voltage battery 4 is a battery capable of supplying a voltage of several hundred volts, for example.

Figure 2:
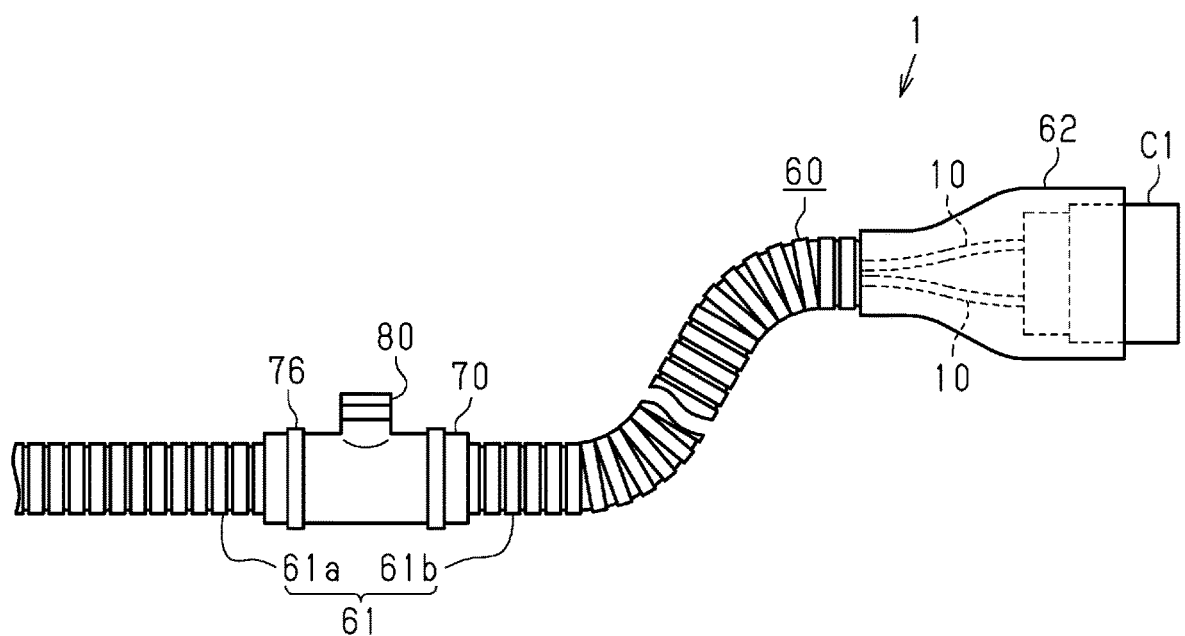
FIG. 2 is a side view of a wire harness according to an embodiment.

As shown in FIGS. 1 and 2, the wire harness 1 includes a plurality of (two in this embodiment) wires 10, connectors C1, which are attached to two end portions of the wires 10, and a protective tube 60, which collectively surrounds the plurality of wires 10. The wires 10 are, for example, high-voltage wires that can support a high voltage and a large current. Also, the wires 10 are unshielded wires that do not have a shielding structure themselves, for example. One of the connectors C1 is connected to an inverter 3, and the other one of the connectors C1 is connected to the high-voltage battery 4. The protective tube 60 protects the wires 10 from flying objects and water drops, for example.

Figure 3:
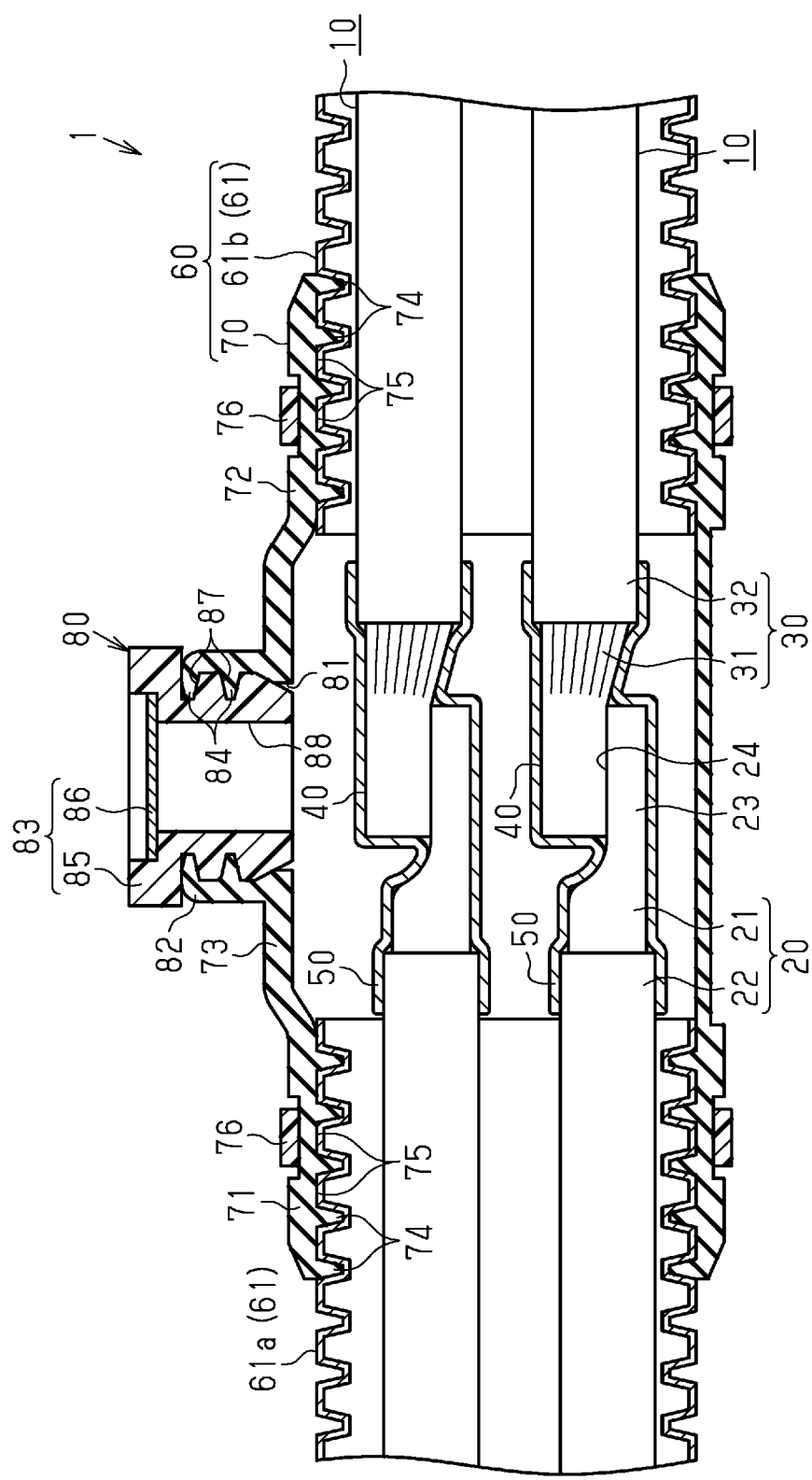
FIG. 3 is a side cross-sectional view of the wire harness according to an embodiment.

As shown in FIG. 3, each of the wires 10 include a single-core wire 20, a stranded wire 30, which is more bendable than the single-core wire 20, and a connecting portion 40 (connection) that electrically connects the single-core wire 20 and the stranded wire 30 to each other.

The single-core wires 20 each include a core wire 21, which is constituted by a single metal rod, and an insulating coating 22, which covers the core wire 21. The core wire 21 is made of aluminum or an aluminum alloy, for example. The shape of a cross-section of the core wire 21 that is perpendicular to the axial direction thereof (i.e. the shape of a cross-section of the core wire 21 that is cut along a plane perpendicular to the axial direction thereof) is a circular shape, for example. For example, the core wire 21 is formed to have a substantially circular column shape that has an inner portion with a solid structure. The insulating coating 22 covers an outer circumferential surface of the core wire 21 while being in intimate contact therewith, for example.

The single-core wire 20 has rigidity that keeps the shape thereof that follows a path along which the wire 10 is laid out, for example. For example, the single-core wire 20, when in a state of being mounted in the vehicle 2 (see FIG. 1), has rigidity with which a straight state or a bent state of the single-core wire 20 is not canceled by vibrations or the like of the vehicle 2. In other words, if, for example, the single-core wire 20 is laid out along a bent path, the single-core wire 20 is bent and the bent shape thereof is kept.

The stranded wire 30 has a core wire 31, which is formed by twisting together a plurality of metal strands, and an insulating coating 32 that covers the core wire 31. One end portion of the core wire 31 is connected to an end portion of the core wire 21 of the single-core wire 20, and the other end portion of the core wire 31 is connected to one of the connectors C1 (see FIG. 2), for example. The metal strands that constitute the core wire 31 are made of aluminum or an aluminum alloy, for example. The insulating coating 32 covers an outer circumferential surface of the core wire 31 while being in intimate contact therewith, for example.

At the connecting portion 40, the core wire 21 of the single-core wire 20 and the core wire 31 of the stranded wire 30 are joined to each other. More specifically, a predetermined length of the insulating coating 22 at an end portion of the single-core wire 20 is stripped from a terminal thereof, and the core wire 21 at this end portion is exposed. Also, a predetermined length of the insulating coating 32 at an end portion of the stranded wire 30 is stripped from a terminal thereof, and the core wire 31 at this end portion is exposed. Furthermore, at the connecting portion 40, the core wire 31 of the stranded wire 30 that is exposed from the insulating coating 32 is joined to the core wire 21 of the single-core wire 20 that is exposed from the insulating coating 22.

At the connecting portion 40 in this example, the core wire 21 and the core wire 31 are laid over and joined to each other in a radial direction (a direction intersecting the axial direction of the core wires 21 and 31). More specifically, a collapsed portion 23, which is collapsed into a flat-plate shape, is formed at the end portion of the core wire 21 of the single-core wire 20 that is exposed from the insulating coating 22. The collapsed portion 23 has a flat face 24, which is formed to be flat. The end portion of the core wire 31 of the stranded wire 30 is laid over and joined to the flat face 24 of the core wire 21 of the single-core wire 20. Thus, the core wire 21 and the core wire 31 are electrically connected to each other. Note that the method for connecting the core wire 21 and the core wire 31 to each other is not particularly limited. For example, the method for joining the core wire 21 and the core wire 31 to each other may be ultrasonic welding, laser welding, or the like.

The connecting portion 40 has a larger area of a cross-section (hereinafter, simply "cross-sectional area") perpendicular to the direction (axial direction) in which the wire 10 extends, than those of the core wire 21 and the core wire 31. That is to say, the cross-sectional area of a conductor portion of the connecting portion 40 is larger than the cross-sectional area of the core wire 21, and is also larger than the cross-sectional area of the core wire 31. The cross-sectional area of the conductor portion of the connecting portion 40 in this example is larger than the cross-sectional area of the single-core wire 20 including the insulating coating 22, and is also larger than the cross-sectional area of the stranded wire 30 including the insulating coating 32. For this reason, the connecting portion 40 in this example is formed to protrude from the single-core wire 20 in the radial direction, and is also formed to protrude from the stranded wire 30 in the radial direction.

Also, the connecting portion 40 has a larger surface area than that of the core wire 21 of the single-core wire 20. More specifically, the surface area of the connecting portion 40 is larger than the surface area of the core wire 21 when compared for the same section length (i.e. for an area in which the lengths of the connecting portion 40 and the core wire 21 in the direction in which the wire 10 extends are the same). For example, the length of the connecting portion 40 in the circumferential direction is larger than the length of the core wire 21 in the circumferential direction.

The connecting portion 40 is covered by an insulating member 50, for example. The insulating member 50 is formed to span between the insulating coating 22 of the single-core wire 20 and the insulating coating 32 of the stranded wire 30, for example. One end portion of the insulating member 50 covers an outer circumferential surface of a terminal portion of the insulating coating 22 while being in intimate contact therewith, and the other end portion of the insulating member 50 covers an outer circumferential surface of a terminal portion of the insulating coating 32 while being in intimate contact therewith. This insulating member 50 ensures electrical insulation properties of the connecting portion 40 and the core wires 21 and 31 that are exposed from the insulating coatings 22 and 32. Also, the wall thickness of the insulating member 50 is smaller than the wall thickness of the insulating coating 22 of the single-core wire 20, and is also smaller than the wall thickness of the insulating coating 32 of the stranded wire 30, for example. The insulating member 50 may be a shrink tube or an insulating tape, for example. The shrink tube may be a heat shrink tube, for example.

The protective tube 60 shown in FIGS. 1 and 2 has an elongated tubular shape as a whole. The protective tube 60 includes corrugated tubes 61, which are tubular members (tubes), water-proofing covers 62, which connect the connectors C1 and the corrugated tubes 61 to each other, and a covering ventilation member 70 (covering ventilation).

The water-proofing covers 62 are fastened and fixed to outer sides of the connectors C1 and outer sides of the corrugated tubes 61 by a band, tape (not shown), or the like. The water-proofing covers 62 are in intimate contact with the outer sides of the connectors C1 and the outer sides of the corrugated tubes 61 in an air-tight manner. The covering ventilation member 70 is in intimate contact with the outer sides of the corrugated tubes 61 in an air-tight manner. Thus, a sealed space surrounded by the protective tube 60 (the corrugated tubes 61, the water-proofing covers 62, and the covering ventilation member 70) is formed between the two connectors C1. As shown in FIG. 2, the aforementioned plurality of wires 10 are collectively accommodated in the sealed space. Note that the water-proofing covers 62 are made of rubber or an elastomer, for example.

As shown in FIG. 3, the corrugated tubes 61 have an elongated tubular shape. The corrugated tubes 61 have a bellows structure in which ring-shaped recessed portions and ring-shaped protruding portions are alternately and continuously arranged along the longitudinal direction (extending direction) of the corrugated tubes 61. Thus, the corrugated tubes 61 can undergo elastic deformation in which the axes thereof bends or curves. The shape of a cross-section of each of the corrugated tubes 61 that is perpendicular to the longitudinal direction thereof is a circular shape, for example. The corrugated tubes 61 are made of a synthetic resin, for example.

The corrugated tubes 61 include a corrugated tube 61*a* for accommodating the single-core wire 20, and a corrugated tube 61*b* for accommodating the stranded wire 30. The corrugated tube 61*a* and the corrugated tube 61*b* are provided with a gap therebetween in the longitudinal direction of the protective tube 60, for example. The corrugated tubes 61*a* and 61*b* in this example are provided such that the connecting portion 40 and a surrounding region of the connecting portion 40 of the wire 10 are exposed to the outside.

The covering ventilation member 70 has a tubular shape that surrounds the outer circumferential surface of the wire 10 and the corrugated tubes 61*a* and 61*b* over their entire circumferences. The covering ventilation member 70 in this example spans between the corrugated tube 61*a* and the corrugated tube 61*b*. The covering ventilation member 70 is made of an elastic material, for example. For example, the covering ventilation member 70 is made of rubber or an elastomer.

The covering ventilation member 70 has a tubular connecting portion 71, which is connected to the corrugated tube 61*a*, a tubular connecting portion 72, which is connected to the corrugated tube 61*b*, and a covering portion 73 (covering), which is tubular and surrounds the connecting portion 40 and a surrounding region of the connecting portion 40 of the wire 10. These tubular connecting portions 71 and 72 and the covering portion 73 are formed integrally.

The tubular connecting portion 71, which is one end portion of the covering ventilation member 70, covers the corrugated tube 61*a*, and the tubular connecting portion 72, which is the other end portion of the covering ventilation member 70, covers the corrugated tube 61*b*. The tubular connecting portions 71 and 72 are fastened and fixed to the outer sides of the corrugated tubes 61*a* and 61*b* by fixing members 76. The tubular connecting portion 71 is in intimate contact with an outer circumferential surface of a terminal portion of the corrugated tube 61*a* in an air-tight manner. The tubular connecting portion 72 is in intimate contact with an outer circumferential surface of a terminal portion of the corrugated tube 61*b* in an air-tight manner. Note that the fixing members 76 may be bands or tape.

Ribs 74, which are fitted to the recessed portions in the outer circumferential surfaces of the corrugated tubes 61*a* and 61*b*, and groove portions 75, which are fitted to the protruding portions on the outer circumferential surfaces of the corrugated tubes 61*a* and 61*b*, are formed on the inner circumferential surfaces of the tubular connecting portions 71 and 72, for example. By fitting the ribs 74 and the groove portions 75 to the recessed portions and the protruding portions on the outer circumferential surfaces of the corrugated tubes 61*a* and 61*b*, the covering ventilation member 70 can be positioned in the axial direction, and a position shift of the covering ventilation member 70 in the axial direction can be suppressed.

The covering portion 73 is provided between the tubular connecting portion 71 and the tubular connecting portion 72. The covering portion 73 in this example is provided so as to surround the connecting portion 40 and the surrounding region of the connecting portion 40 that are exposed from the corrugated tubes 61*a* and 61*b*. Here, the surrounding region of the connecting portion 40 includes, for example, the core wire 21 of the single-core wire 20 of the wire 10 that is exposed from the insulating coating 22, and the core wire 31 of the stranded wire 30 of the wire 10 that is exposed from the insulating coating 32. The surrounding region of the connecting portion 40 includes an area of the wire 10 that is covered by the insulating member 50, for example. The surrounding region of the connecting portion 40 includes, for example, a portion of the insulating coating 22 of the single-core wire 20 that is exposed from the insulating member 50, and a portion of the insulating coating 32 of the stranded wire 30 that is exposed from the insulating member 50.

The inner diameter of the covering portion 73 is larger than the inner diameter of the corrugated tube 61*a*, and is also larger than the inner diameter of the corrugated tube 61*b*. For example, the inner diameter of the covering portion 73 is larger than the inner diameter of the tubular connecting portion 71, and is also larger than the inner diameter of the tubular connecting portion 72.

The covering portion 73 is provided with a ventilation portion 80 (ventilation), which has the property of allowing the passage of gas and restricting the passage of liquid. The ventilation portion 80 can be formed at any position in the axial direction, on the covering portion 73. The ventilation portion 80 in this example is formed at a position that opposes the connecting portion 40 in the axial direction of the covering portion 73. That is to say, the ventilation portion 80 in this example is formed at a position that overlaps the connecting portion 40 as viewed in a plan view. Also, the ventilation portion 80 can be formed at any position in the circumferential direction on the covering portion 73. As shown in FIG. 1, the ventilation portion 80 in this example is formed so as to be oriented upward relative to ground G1 (i.e. in a direction away from the ground G1) when the wire harness 1 is fitted to the vehicle 2. That is to say, the ventilation portion 80 in this example is provided directly above the connecting portion 40.

As shown in FIG. 3, the ventilation portion 80 has a ventilation hole 81 for bringing the outside and the inside of the covering portion 73 into communication with each other, a tubular portion 82, which protrudes in the radial direction from an outer circumferential surface of the covering portion 73, and an air-permeable film unit 83, which is attached to the tubular portion 82.

The tubular portion 82 encompasses the ventilation hole 81. That is to say, the tubular portion 82 is provided such that a cavity portion provided therein and the ventilation hole 81 are in communication with each other. The tubular portion 82 is formed to have a cylindrical shape, for example. A plurality of locking protrusions 84, which extend in the circumferential direction, are formed on an inner circumferential surface of the tubular portion 82 with a gap therebetween in the axial direction of the tubular portion 82. The tubular portion 82 is formed integrally with the covering portion 73, for example. That is to say, a portion of the ventilation portion 80 is formed integrally with the covering ventilation member 70.

The air-permeable film unit 83 is a member separate from the covering ventilation member 70. The air-permeable film unit 83 is attached to a protruding end side of the tubular portion 82. The air-permeable film unit 83 is a member in which a tubular holding member 85 and an air-permeable film 86 are integrated with each other.

The holding member 85 is made of a synthetic resin that is more rigid than the covering portion 73, for example. The holding member 85 is formed to have a cylindrical shape, for example. A plurality of locking grooves 87, which extend in the circumferential direction, are formed on the outer circumferential surface of the holding member 85 with a gap therebetween in the axial direction of the holding member 85. In the holding member 85, a communication hole 88 is formed, which is in communication with the ventilation hole 81 and brings the outside and the inside of the covering portion 73 into communication with each other.

Figure 4:
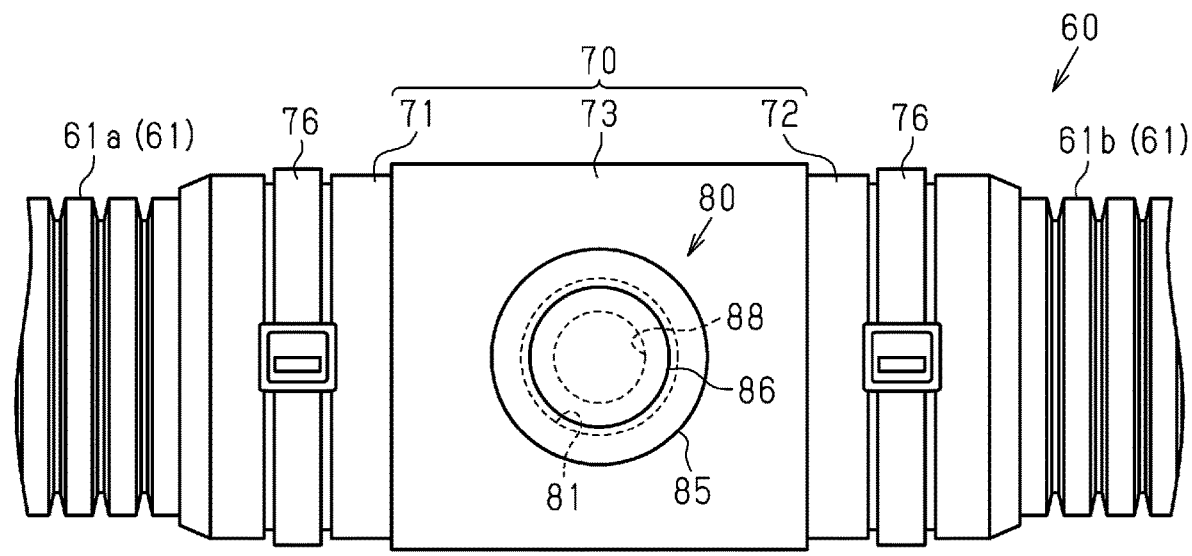
FIG. 4 is a plan view of the wire harness according to an embodiment.

As shown in FIGS. 3 and 4, the air-permeable film 86 is provided at a rear end portion of the holding member 85 so as to close the communication hole 88 of the holding member 85. The air-permeable film 86 is integrated with the holding member 85 through molding or the like, for example. The air-permeable film 86 has the property of allowing the passage of gas and restricting the passage of liquid. The air-permeable film 86 may be a porous resin film, woven fabric, nonwoven fabric, a net, a foamed body, or the like. For example, an air-permeable film that is made of a polytetrafluoroethylene (PTFE) porous body, which is fluorocarbon resin, is highly air-permeable, and can be favorably used in terms of the ability to keep foreign substances, such as water and dust, from entering.

In the air-permeable film unit 83 shown in FIG. 3, the holding member 85 is fitted into the tubular portion 82 from a base end portion thereof, and is thus attached to the covering portion 73 (the covering ventilation member 70). Upon the air-permeable film unit 83 being attached to the covering portion 73, the plurality of locking grooves 87 in the outer circumferential surface of the holding member 85 and the plurality of locking protrusions 84 on the inner circumferential surface of the tubular portion 82 lock to each other, while being in intimate contact with each other. Due to this locking, the air-permeable film unit 83 is kept in a state of being attached to the covering portion 73, and the gap between the inner circumferential surface of the tubular portion 82 and the outer circumferential surface of the holding member 85 is kept in a sealed state.

Next, operations and effects of the wire harness 1 according to this embodiment will be described.

(1) The connecting portion 40 that electrically connects the single-core wire 20 and the stranded wire 30 to each other has a larger area of a cross-section perpendicular to the direction in which the wire 10 extends, than those of the core wire 21 of the single-core wire 20 and the core wire 31 of the stranded wire 30. Due to this configuration, the connecting portion 40 has less heat generated per unit cross-sectional area when a current flows therethrough, than those of the core wires 21 and 31. Accordingly, heat is readily transmitted to the connecting portion 40 from the wire 10 in a surrounding region of the connecting portion 40 (e.g. from a portion at which only the single-core wire 20 is provided, a portion at which only the stranded wire 30 is provided). Furthermore, the ventilation portion 80 that allows the passage of gas is provided near the connecting portion 40 that serves as a destination to which heat generated in other sections is transmitted (escapes). Air that has been warmed near the connecting portion 40 is released to the outside of the protective tube 60 through the ventilation portion 80. Specifically, air that has been warmed near the connecting portion 40 by heat generated at the connecting portion 40 itself, heat transmitted from the wire 10 in a section other than the connecting portion 40, and the like, is released to the outside of the protective tube 60 through the ventilation portion 80. Thus, heat is less likely to accumulate near the connecting portion 40, heat dissipation at the connecting portion 40 can thus be improved, and an increase in the temperature at the connecting portion 40 can be suppressed. Furthermore, if an increase in the temperature at the connecting portion 40 is suppressed, the temperature at the connecting portion 40 is relatively lower than that in other sections. As a result, heat is readily transmitted to the connecting portion 40 from sections other than the connecting portion 40, and an increase in the temperature of the wire 10 in the sections other than the connecting portion 40 can be suppressed. Thus, heat dissipation in the entire wire harness 1 can be improved and an increase in the temperature of the entire wire 10 can be suppressed by providing the ventilation portion 80 near the connecting portion 40.

(2) The surface area of the connecting portion 40 is larger than the surface area of the core wire 21 of the single-core wire 20 when compared for the same section length. Due to this configuration, the connecting portion 40 has better heat dissipation than that of the core wire 21 of the single-core wire 20. Since the ventilation portion 80 is provided near the connecting portion 40 with good heat dissipation, air that has been warmed near the connecting portion 40 can be efficiently released to the outside through the ventilation portion 80. As a result, heat dissipation of the entire wire harness 1 can be further improved.

(3) The connecting portion 40 is exposed from the corrugated tubes 61. According to this configuration, fewer members are interposed between the connecting portion 40 and the ventilation hole 81 than in the case where the connecting portion 40 is surrounded by the corrugated tubes 61, and thus, air that has been warmed near the connecting portion 40 is more readily discharged from the ventilation portion 80 to the outside. Accordingly, heat dissipation of the wire harness 1 can be improved compared with the case where the connecting portion 40 is surrounded by the corrugated tubes 61.

(4) The connecting portion 40 is exposed from the corrugated tubes 61 and is surrounded by the covering ventilation member 70. According to this configuration, the inner diameter of the corrugated tubes 61 can be selected in accordance with the outer diameters of the single-core wire 20 and the stranded wire 30, without depending on the shape of the connecting portion 40, which has a large cross-sectional area. Accordingly, the inner diameter and the outer diameter of the corrugated tubes 61 can be made smaller than those in the case where the connecting portion 40 is accommodated in the corrugated tubes 61, and the layout space for the corrugated tubes 61 can be reduced.

(5) The covering ventilation member 70 is attached so as to span between the corrugated tube 61a and the corrugated tube 61b and surround the connecting portion 40, which is exposed from the corrugated tubes 61a and 61b. According to this configuration, the inner diameter of the covering ventilation member 70 is set according to the shape of the connecting portion 40, which has a large cross-sectional area. Meanwhile, the inner diameters of the corrugated tube 61a can be selected in accordance with the outer diameter of the single-core wire 20. Similarly, the inner diameter of the corrugated tube 61b can be selected in accordance with the outer diameter of the stranded wire 30, without depending on the outer diameter of the connecting portion 40, which has a large cross-sectional area. Accordingly, the inner diameters of the corrugated tubes 61a and 61b can be made smaller than the inner diameter of the covering ventilation member 70. That is to say, by increasing the size of only the covering ventilation member 70 that surrounds the connecting portion 40, an increase in the size of other members, namely the corrugated tubes 61a and 61b can be suppressed, and an increase in the entire protective tube 60 can be suppressed.

(6) The inner diameter of the corrugated tube 61a for accommodating the single-core wire 20 and the inner diameter of the corrugated tube 61b for accommodating the stranded wire 30 can be set separately. Thus, the inner diameter of the corrugated tube 61a and the inner diameter of the corrugated tube 61b can be set to different inner diameters.

(7) If the wall thickness of the insulating member 50 for covering the connecting portion 40 is made smaller than the wall thickness of the insulating coating 22 of the single-core wire 20 and smaller than the wall thickness of the insulating coating 32 of the stranded wire 30, an increase in the size of the outer shape of the connecting portion 40 and the insulating member 50 can thus be suppressed.

(8) Furthermore, since heat is less likely to accumulate at the connecting portion 40 than in the case where the wall thickness of the insulating member 50 is large, heat dissipation at the connecting portion 40 can be improved. As a result, heat dissipation of the entire wire harness 1 can be improved.

(9) When the wire harness 1 is fitted to the vehicle 2, if the ventilation portion 80 is oriented upward relative to the ground G1, this configuration allows air with an increased temperature and a reduced density in the covering portion 73 to be readily discharged to the outside through the ventilation portion 80. Accordingly, heat dissipation of the wire harness 1 can be increased.

(10) If the covering ventilation member 70 is made of an elastic material, this configuration enables the corrugated tubes 61a and 61b to be covered by the covering ventilation member 70 while expanding and deforming the covering ventilating portion 70. Thus, operability can be improved when the covering ventilation member 70 is attached to the corrugated tubes 61a and 61b.

Other Embodiments

Note that the above embodiment may also be modified as follows.

In the above embodiment, when the wire harness 1 is fitted to the vehicle 2, the ventilation portion 80 is oriented upward relative to the ground G1. However, the ventilation portion 80 may alternately be arranged so as to be oriented in another direction (e.g. a direction toward the ground G1).

In the above embodiment, the ventilation portion 80 opposes the connecting portion 40 of the wire 10, but the position of the covering portion 73 in the axial direction is not limited thereto. For example, the ventilation portion 80 may alternatively be provided at a position shifted from the connecting portion 40 in the axial direction of the covering portion 73. For example, the ventilation portion 80 may oppose a surrounding region of the connecting portion 40.

In the above embodiment, the covering portion 73 is provided with one ventilation portion 80, but the covering portion 73 may alternatively be provided with a plurality of ventilation portions 80.

Figure 5:
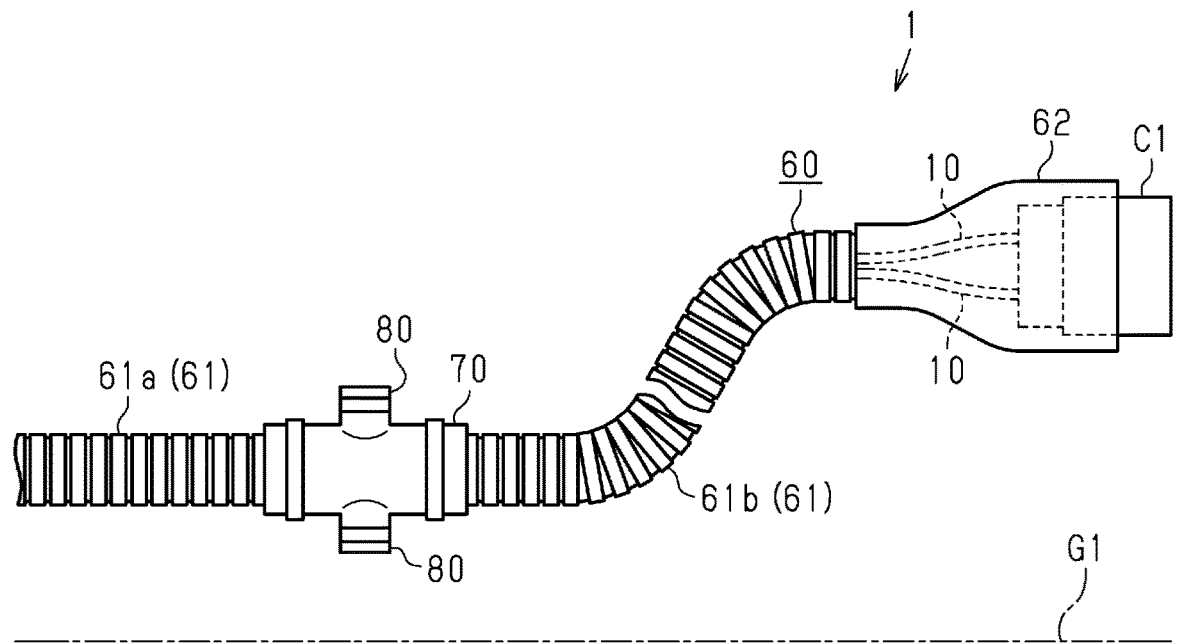
FIG. 5 is a side view of a wire harness according to a modification.

For example, the covering portion 73 may be provided with two ventilation portions 80, as shown in FIG. 5. In this case, one of the ventilation portions 80 functions as an intake port for taking in outside air into the covering portion 73, and the other one of the ventilation portions 80 functions as an outlet port for discharging air in the covering portion 73 to the outside. Thus, air can flow in the covering portion 73. Thus, heat is unlikely to accumulate in the protective tube 60, and heat dissipation of the wire harness 1 can be improved.

In the example in FIG. 5, when the wire harness 1 is fitted into a vehicle, one of the ventilation portions 80 is oriented upward relative to the ground G1, and the other one of the ventilation portions 80 is oriented toward the ground G1. Furthermore, the two ventilation portions 80 are provided at positions that oppose each other with the wires 10 therebetween. By employing this configuration, a linear path is formed between the ventilation portion 80 that functions as an intake port and the ventilation portion 80 that functions as an outlet port. Thus, air is likely to flow from the intake port toward the outlet port. Due to this configuration, air that has been warmed near the connecting portion 40 can be efficiently released to the outside of the protective tube 60 through the outlet port (the ventilation portion 80). Accordingly, heat is unlikely to accumulate in the protective tube 60, and heat dissipation of the wire harness 1 can be further improved.

Note that the positions at which the plurality of ventilation portions 80 are provided are not particularly limited. For example, at least one of the plurality of ventilation portions 80 may be provided extending along the direction in which the vehicle 2 advances. In this case, it is preferable that a protruding end of each ventilation portion 80 is oriented toward the front side of the vehicle 2. By employing this configuration, wind blowing from the front side toward the rear side of the vehicle while the vehicle 2 is traveling can be efficiently taken into the covering portion 73. As a result, heat dissipation of the wire harness 1 can be further improved.

The ventilation portion 80 according to the above embodiment is provided with the tubular portion 82 that protrudes in the radial direction from the outer circumferential surface of the covering portion 73, and the air-permeable film unit 83 that has the air-permeable film 86 is fixed to the tubular portion 82. However, the structure of the ventilation portion 80 is not limited thereto. For example, the air-permeable film 86 may alternatively be directly fixed to the ventilation hole 81 in the covering ventilation member 70. In this case, the tubular portion 82 and the holding member 85 are omitted.

To increase the strength of the air-permeable film 86 in the above embodiment, another porous body, woven fabric, nonwoven fabric, net, foamed body, mesh, or the like may be laminated, as a reinforcing layer, on the air-permeable film 86.

The wall thickness of the insulating member 50 according to the above embodiment may be equal to the wall thickness of the insulating coating 22 of the single-core wire 20, or may be larger than the wall thickness of the insulating coating 22. Also, the wall thickness of the insulating member 50 may be equal to the wall thickness of the insulating coating 32 of the stranded wire 30, or may be larger than the wall thickness of the insulating coating 32.

In the above embodiment, the connecting portion 40 is covered by the insulating member 50, which is constituted by a shrink tube or the like, but the connecting portion 40 may alternatively be covered by a hard protector that is made of a synthetic resin, or the like, in place of the insulating member 50. Also, the insulating member 50 and the aforementioned protector may be used together.

In the above embodiment, the core wire 21 of the single-core wire 20 and the core wire 31 of the stranded wire 30 are directly joined and electrically connected to each other, but the present disclosure is not limited thereto. For example, the core wire 21 and the core wire 31 may alternatively be electrically connected to each other via a conductive member. For example, a configuration may be employed in which a conductive pipe member is interposed between an end portion of the core wire 21 and an end portion of the core wire 31, the end portion of the core wire 21 of the single-core wire 20 is joined to one end portion of the pipe member, and the end portion of the core wire 31 of the stranded wire 30 is joined to the other end portion of the pipe member. The method for joining the pipe member to the core wires 21 and 31 may be ultrasonic welding, crimping, spinning, swaging, or the like, for example.

In the above embodiment, the core wire 21 of the single-core wire 20 is formed to have a cylindrical shape, but the core wire 21 may alternatively be formed to have a prism shape or a semi-cylindrical shape, for example.

The metal materials that constitute the strands of the core wire 21 of the single-core wire 20 and the core wire 31 of the stranded wire 30 in the above embodiment are not particularly limited. For example, the strands of the core wire 21 and the core wire 31 may be made of copper or a copper alloy.

In the above embodiment, the single-core wire 20 is embodied as a first wire. The present disclosure is not limited thereto. For example, a tubular conductor (pipe conductor) that is conductive and has an inner portion with a hollow structure may be used in place of the single-core wire 20.

In the above embodiment, the stranded wire 30 is embodied as a second wire. The present disclosure is not limited thereto. For example, a braided wire that is obtained by braiding a plurality of metal strands may be used in place of the stranded wire 30.

In the above embodiment, the corrugated tubes 61*a* and 61*b* are provided such that the connecting portion 40 is exposed from the corrugated tubes 61*a* and 61*b*, but the present disclosure is not limited thereto. For example, at least one of the corrugated tubes 61*a* and 61*b* may be configured to surround the connecting portion 40.

In the above embodiment, each of the corrugated tubes 61*a* and 61*b* that are made of resin is embodied as a tubular member, but the present disclosure is not limited thereto. For example, the tubular member may be a resin pipe that is harder than a corrugated tube and made of resin, a metal pipe that is made of metal, or the like, in place of a corrugated tube. Also, a corrugated tube and a resin pipe or a metal pipe may be freely combined and used as the tubular member.

In the above embodiment, the covering ventilation member 70 is made of rubber or an elastomer, but the present disclosure is not limited thereto. For example, the covering ventilation member may be a corrugated tube, a resin pipe, or a metal pipe. For example, if a corrugated tube is used as the covering ventilation member, a ventilation portion is provided in a portion (covering portion) of the corrugated tube that surrounds the connecting portion 40 and a surrounding area thereof. In this case, an end portion of the corrugated tube (covering ventilation member) may also be connected to the water-proofing covers 62. That is to say, the corrugated tube (covering ventilation member) in this case surrounds the connecting portion 40 and also surrounds the substantially entire length of the stranded wire 30, for example.

The wire harness 1 according to the above embodiment may be provided with a plurality of covering ventilation members 70. For example, a configuration of each wire 10 is conceivable in which stranded wires are connected to two end portions of the single-core wire 20. In this case, covering ventilation members 70 may be separately provided for two connecting portions formed at the two end portions of the single-core wire 20.

In the above embodiment, two wires 10 are inserted into the protective tube 60, but the number of wires 10 is not particularly limited, and the number of wires 10 can be changed in accordance with the specifications of the vehicle 2. For example, the number of wires 10 to be inserted into the protective tube 60 may be one, or may be three or more.

Although not particularly mentioned in the above embodiment, a configuration in which an electromagnetic shielding member is provided in the protective tube 60 may also be employed. The electromagnetic shielding member collectively surrounds the plurality of wires 10, for example. The electromagnetic shielding member is provided between an inner face of the protective tube 60 and outer surfaces of the wires 10, for example. The electromagnetic shielding member may be a flexible braided wire or metal foil, for example.

In the above embodiment, the inverter 3 and the high-voltage battery 4 are employed as electrical devices to be connected to each other by the wires 10, but the present disclosure is not limited thereto. For example, the present disclosure may be employed for wires that connect the inverter 3 and a motor for driving wheels to each other. That is to say, the present disclosure is applicable to wires that electrically connect electrical devices mounted in the vehicle 2.

The above embodiment and the modifications may be combined as appropriate.

It will be apparent for a person skilled in the art that the present disclosure may also be embodied in other unique modes without departing from the technical idea thereof. For example, some of the components described in the embodiment (or one or more modes thereof) may be omitted, or may be combined.

The invention claimed is:

1. A wire harness comprising:
   a wire having a first wire, a second wire that is more bendable than the first wire, and a connection for electrically connecting the first wire and the second wire to each other;
   a tube for accommodating at least one of the first wire and the second wire; and
   a covering ventilation that is tubular and having a covering that overlaps: (a) the connection, and (b) a surrounding region of the connection of the wire, the covering ventilation being connected to the tube, wherein:
   the covering is provided with a ventilation having a property of allowing a passage of gas and restricting a passage of liquid, and
   the connection has a larger area of a cross-section than that of a core wire of the first wire and that of a core wire of the second wire, the cross-section being perpendicular to a direction in which the wire extends.

2. The wire harness according to claim 1, wherein a surface area of the connection is larger than a surface area of the core wire of the first wire when compared for a same section length.

3. The wire harness according to claim 1, wherein the connection is exposed from the tube.

4. The wire harness according to claim 3, wherein
   the tube has a first tube for accommodating the first wire, and a second tube for accommodating the second wire, and
   the covering ventilation is attached so as to span between the first tube and the second tube.

5. The wire harness according to claim 4, wherein an inner diameter of the covering is larger than an inner diameter of the first tube, and is also larger than an inner diameter of the second tube.

6. The wire harness according to claim 1, further comprising:
   an insulation for covering the connection, wherein a wall thickness of the insulation is smaller than a wall thickness of an insulating coating of the first wire, and is also smaller than a wall thickness of an insulating coating of the second wire.

7. The wire harness according to claim 1, wherein the ventilation is oriented upward relative to ground when the wire harness is fitted to a vehicle.

8. The wire harness according to claim 1, wherein
   the ventilation is one of a plurality of ventilations with which the covering is provided, and
   at least one of the plurality of ventilations is oriented upward relative to ground when the wire harness is fitted to a vehicle.

9. The wire harness according to claim 8, wherein two of the plurality of ventilations are provided at opposing positions with the wire therebetween.

10. The wire harness according to claim 1, wherein the connection has a larger area of a cross-section than a cross-sectional area of the tube.

* * * * *